(12) United States Patent
Maeda et al.

(10) Patent No.: US 8,920,695 B2
(45) Date of Patent: Dec. 30, 2014

(54) METHOD OF PRODUCING LIQUID CRYSTAL POLYESTER COMPOSITION

(75) Inventors: Mitsuo Maeda, Tsukuba (JP); Yasuo Matsumi, Tsukuba (JP)

(73) Assignee: Sumitomo Chemical Company, Limited, Tokyo (JP)

(*) Notice: Subject to any disclaimer, the term of this patent is extended or adjusted under 35 U.S.C. 154(b) by 0 days.

(21) Appl. No.: 13/418,419

(22) Filed: Mar. 13, 2012

(65) Prior Publication Data

US 2012/0235090 A1  Sep. 20, 2012

(30) Foreign Application Priority Data

Mar. 17, 2011  (JP) .............. P2011-059474

(51) Int. Cl.
| | |
|---|---|
| *B29C 47/60* | (2006.01) |
| *C08L 67/03* | (2006.01) |
| *B29C 47/80* | (2006.01) |
| B29C 47/00 | (2006.01) |
| B29C 47/10 | (2006.01) |
| B29C 47/40 | (2006.01) |
| B29C 47/76 | (2006.01) |
| B29K 105/00 | (2006.01) |
| B29K 105/16 | (2006.01) |
| C08K 7/02 | (2006.01) |

(52) U.S. Cl.
CPC ............ *C08L 67/03* (2013.01); *B29C 47/80* (2013.01); *B29C 47/6056* (2013.01); *B29C 47/0004* (2013.01); *B29C 47/1081* (2013.01); *B29C 47/40* (2013.01); *B29C 47/76* (2013.01); *B29K 2105/0079* (2013.01); *B29K 2105/16* (2013.01); *B29C 47/1045* (2013.01); *B29C 47/1063* (2013.01); *C08K 7/02* (2013.01)
USPC .................................. 264/211.23

(58) Field of Classification Search
USPC ....................................... 264/211.23
See application file for complete search history.

(56) References Cited

U.S. PATENT DOCUMENTS

| | | | |
|---|---|---|---|
| 2003/0001139 A1* | 1/2003 | Nagano et al. ........... | 252/299.67 |
| 2010/0327728 A1 | 12/2010 | Saito et al. | |
| 2012/0217678 A1* | 8/2012 | Komatsu et al. .......... | 264/328.1 |

FOREIGN PATENT DOCUMENTS

| | | |
|---|---|---|
| JP | 04-292651 A | 10/1992 |
| JP | 10-180841 A | 7/1998 |
| JP | 2002-294038 A | 10/2002 |
| JP | 2011-026579 A | 2/2011 |
| JP | 2011-046191 A | 3/2011 |

OTHER PUBLICATIONS

Office Action issued Sep. 16, 2014 in JP Application No. 2011-059474.

* cited by examiner

*Primary Examiner* — Larry Thrower
(74) *Attorney, Agent, or Firm* — Panitch Schwarze Belisario & Nadel LLP

(57) ABSTRACT

A method of producing a liquid crystal polyester composition, the twin-screw extruder including a cylinder having a supply port for supplying the liquid crystal polyester, a first addition port for adding the filler other than fibrous fillers and a second addition port for adding a fibrous filler which are provided downstream of the supply port, and a screw provided with kneading portions on the upstream side and downstream side of the first addition port, a resin temperature (T1) of the liquid crystal polyester after kneading in the nearest upstream kneading portion satisfying formula (1), and a resin temperature (T2) of the liquid crystal polyester after kneading in the nearest downstream kneading portion satisfying formula (2):

$$FT-100(° C.) \leq T1 \leq FT+20(° C.) \quad (1)$$

$$FT-100(° C.) \leq T2 \leq FT+30(° C.) \quad (2)$$

wherein FT represents the flow starting temperature of the liquid crystal polyester.

6 Claims, 1 Drawing Sheet

METHOD OF PRODUCING LIQUID CRYSTAL POLYESTER COMPOSITION

TECHNICAL FIELD

The present invention is related to a method of producing a liquid crystal polyester composition.

Priority is claimed on Japanese Patent Application No. 2011-059474, filed Mar. 17, 2011, the content of which is incorporated herein by reference.

BACKGROUND ART

In recent years, following the miniaturization and reduction in weight and thickness of electronic/electric appliances, integrated circuits used in these appliances having been miniaturized, and progress has been made in narrowing the pitch of connectors of the integrated circuits. As the molding material for such connectors, liquid crystal polyesters which exhibit excellent melt flowability, heat resistance and mechanical properties are preferably used.

In a liquid crystal polyester, the molecular chains are likely to be oriented in the flowing direction during molding, and is therefore likely to become anisotropic with respect to mold shrinkage ratio and mechanical properties in the flowing direction and the direction perpendicular to the flow. In order to reduce the anisotropy, various fillers such as fibrous fillers and plate-like fillers have been added (see Patent Document 1).

DOCUMENTS OF RELATED ART

Patent Document

[Patent Document 1] JP2002-294038

SUMMARY OF THE INVENTION

However, liquid crystal polyesters are susceptible to hydrolysis by water or basic components. For this reason, when a liquid crystal polyester and a filler are melt-kneaded by using an extruder, the liquid crystal polyester is hydrolyzed by water and the like contained in the filler, such that there were possibilities of deteriorating the heat resistance temperature. Further, as a result of the hydrolysis of the liquid crystal polyester, volatile components (gas) are generated. When such a gas flows into a hopper (supply port) of the extruder, the resin in the hopper is blown up (this phenomenon is sometimes referred to as "shoot up"), such that the supply of resin into the extruder is delayed. As a result, there was a possibility that the amount of product extruded is decreased, thereby lowering the productivity.

The present invention takes the above circumstances into consideration, with an object of providing a method of producing a liquid crystal polyester composition in which hydrolysis of liquid polyester is suppressed, thereby suppressing deterioration of heat resistance of the liquid crystal polyester composition.

For solving the above-mentioned problems, the present invention provides a method of producing a liquid crystal polyester composition including melt-kneading and extruding a liquid crystal polyester and a filler by a twin-screw extruder, the twin-screw extruder including a cylinder having a supply port for supplying at least the liquid crystal polyester, an addition port for adding a filler which is provided downstream of the supply port, the addition port including a first addition port for adding the filler other than fibrous fillers and a second addition port for adding a fibrous filler, and a screw provided with kneading portions on the upstream side and downstream side of the first addition port, a resin temperature of the liquid crystal polyester after being kneaded in the kneading portion provided nearest to the first addition port on the upstream side thereof satisfying formula (1) shown below, and a resin temperature of the liquid crystal polyester after being kneaded in the kneading portion provided nearest to the first addition port on the downstream side thereof satisfying formula (2) shown below:

$$FT-100(°C.) \leq T1 \leq FT+20(°C.) \quad (1)$$

wherein T1 represents a temperature of the liquid crystal polyester after kneading, and FT represents a flow starting temperature of the liquid crystal polyester; and $$FT-100(°C.) \leq T2 \leq FT+30(°C.) \quad (2)$$

wherein T2 represents a temperature of the liquid crystal polyester after kneading, and FT represents the flow starting temperature of the liquid crystal polyester.

In the present invention, it is preferable that the kneading portion provided nearest to the first addition port on the downstream side thereof has a screw configuration which does not use a reverse kneading disc.

In the present invention, it is preferable that the first addition port is provided upstream of the second addition port.

In the present invention, it is preferable that the cylinder has a vent provided downstream of the kneading portion provided nearest to the first addition port on the downstream thereof.

In the present invention, it is preferable that the cylinder has a vent, the vent provided most downstream is a vacuum vent, and a gauge pressure of the vacuum vent is −0.05 MPa or less.

In the present invention, it is preferable that the filler other than fibrous fillers is talc or mica.

In the present invention, it is preferable that the liquid crystal polyester composition includes 100 parts by weight of the liquid crystal polyester, 20 to 200 parts by weight of the filler other than fibrous fillers, and 20 to 200 parts by weight of the fibrous filler.

According to the present invention, hydrolysis of liquid polyester is suppressed, thereby enabling production of liquid crystal polyester composition in which deterioration of heat resistance is suppressed.

DETAILED DESCRIPTION OF THE INVENTION

Hereinbelow, the method of producing a liquid crystal polyester composition according to the present embodiment will be described with reference to the drawings. In all the figures, the size and ratio of each component are appropriately differed for easier understanding of the figures.

Figure 1:
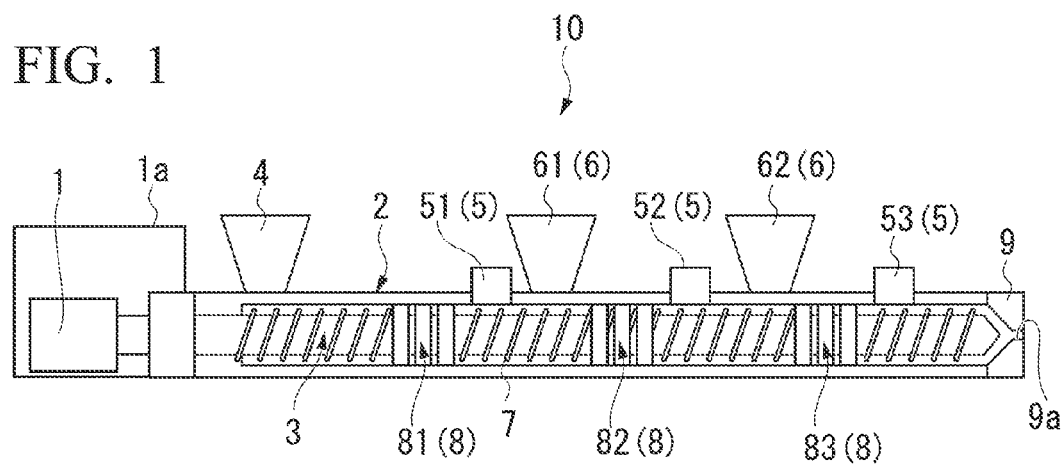
FIG. 1 is a schematic cross-sectional diagram showing one example of an extruder used in the method of the present invention.

FIG. 1 is a schematic cross-sectional diagram showing one example of an extruder used in the method of producing a liquid crystal polyester composition according to the present embodiment. Herebelow in the method according to the present embodiment will be explained referring to a case where a liquid crystal polyester and other desired optional components are melt-kneaded using the extruder shown in FIG. 1, and pellets containing the liquid crystal polyester are produced.

As shown in the figure, the extruder 10 used in the present embodiment has a motor 1 accommodated in a motor box 1a, a cylinder 2 provided adjacent to the motor box 1a, and a screw 3 inserted in the cylinder 2 and connected to the motor 1.

The cylinder 2 has a supply port 4 and an addition port (first addition port 61 and second addition port 62) where the liquid crystal polyester and other components to be kneaded with the liquid crystal polyester are supplied to the cylinder 2, two vents 5 (first vent 51, second vent 52 and third vent 53) which discharge the volatile components (gas) generated within the cylinder 2, and strand die 9 which molds the molten resin.

The screw 3 has a transport part 7 which transports the resin, and a kneading portions 8 (first kneading portion 81, second kneading portion 82 and third kneading portion 83).

Herebelow the liquid crystal polyester and other component s used in the method according to the present embodiment will be described, and then the extruder 10 will be described in detail with reference to FIG. 1.

(Liquid Crystal Polyester)

The liquid crystal polyester used in the method according to the present embodiment is a liquid crystal polyester which is mesomorphous in a molten state, and preferably melts at a temperature of 450° C. or lower. The liquid crystal polyester may be a liquid crystal polyester amide, a liquid crystal polyester ether, a liquid crystal polyester carbonate or a liquid crystal polyester imide. As the liquid crystal polyester, a wholly aromatic liquid crystal polyester obtained by using only aromatic monomers as raw materials is preferable.

Typical examples of the liquid crystal polyester include a liquid crystal polyester obtained by polymerizing (polycondensing) an aromatic hydroxycarboxylic acid, an aromatic dicarboxylic acid and at least one compound selected from the group consisting of an aromatic diol, an aromatic hydroxyamine and an aromatic diamine: a liquid crystal polyester obtained by polymerizing a plurality of aromatic hydroxycarboxylic acids; a liquid crystal polyester obtained by polymerizing an aromatic dicarboxylic acid and at least one compound selected from the group consisting of an aromatic diol, an aromatic hydroxyamine and an aromatic diamine; and a liquid crystal polyester obtained by polymerizing a polyester such as polyethylene terephthalate and an aromatic hydroxycarboxylic acid. The aromatic hydroxycarboxylic acid, the aromatic dicarboxylic acid, the aromatic diol, the aromatic hydroxyamine and the aromatic diamine may each independently have part or all thereof changed to a polymerizable derivative.

Examples of polymerizable derivatives of a compound having a carboxyl group such as an aromatic hydroxycarboxylic acid or an aromatic dicarboxylic acid include a compound having the carboxyl group replaced with an alkoxycarbonyl group or an aryloxycarbonyl group (i.e., an ester): a compound having the carboxyl group replaced with a haloformyl group (i.e., an acid halide); and a compound having the carboxyl group replaced with an acyloxycarbonyl group (i.e., an acid anhydride).

An example of a polymerizable derivative of a compound having a hydroxy group such as an aromatic hydroxycarboxylic acid, an aromatic diol or an aromatic hydroxyamine includes a compound having the hydroxyl group acylated to be converted to an acyloxy group (i.e., an acylated compound).

An example of a polymerizable derivative of a compound having an amino group such as an aromatic hydroxyamine or an aromatic diamine includes a compound having the amino group acylated to be converted to an acylamino group (i.e., an acylated compound).

The liquid crystal polyester preferably has a repeating unit represented by chemical formula (1) shown below (hereafter, frequently referred to as "repeating unit (1)"), and more preferably has a repeating unit (1), a repeating unit represented by chemical formula (2) shown below (hereafter, frequently referred to as "repeating unit (2)") and a repeating unit represented by chemical formula (3) shown below (hereafter, frequently referred to as "repeating unit (3)").

$$—O—Ar^1—CO— \tag{1}$$

$$—CO—Ar^2—CO— \tag{2}$$

$$—X—Ar^3—Y— \tag{3}$$

In chemical formula (1) above, $Ar^1$ represents a phenylene group, a naphthylene group or a biphenylene group. In chemical formulae (2) and (3) above, $Ar^3$ and $Ar^3$ each independently represent a phenylene group, a naphthylene group, a biphenylene group or a group represented by chemical formula (4) shown below. X and Y each independently represent an oxygen atom or an imino group (—NH—). Each hydrogen atom within the group represented by $Ar^1$, $Ar^2$ or $Ar^3$ may independently be substituted with a halogen atom, an alkyl group or an aryl group.

$$—Ar^4—Z—Ar^5— \tag{4}$$

$Ar^4$ and $Ar^5$ each independently represent a phenylene group or a naphthylene group. Z represents an oxygen atom, a sulfur atom, a carbonyl group, a sulfonyl group or an alkylidene group.

Examples of the aforementioned halogen atom include a fluorine atom, a chlorine atom, a bromine atom and an iodine atom. Examples of the aforementioned alkyl group include a methyl group, an ethyl group, an n-propyl group, an isopropyl group, an n-butyl group, an isobutyl group, an s-butyl group, a t-butyl group, an n-pentyl group, an n-hexyl group, an n-heptyl group, a 2-ethylhexyl group, an n-octyl group, an n-nonyl group and an n-decyl group. The alkyl group preferably has 1 to 10 carbon atoms. Examples of the aforementioned aryl group include a phenyl group, an o-tolyl group, a m-tolyl group, a p-tolyl group, a 1-naphthyl group and a 2-naphthyl group. The aryl group preferably has 6 to 20 carbon atoms. When any of the aforementioned $Ar^1$, $Ar^2$ and $Ar^3$ groups have their hydrogen atoms substituted, the number of substituted hydrogen atoms in the individual group is preferably no more than two, more preferably no more than one.

Examples of the aforementioned alkylidene group include a methylidene group, an ethylidene group, an isopropylidene group, and n-butylidene group and a 2-ethylhexylidene group. The alkylidene group preferably has 1 to 10 carbon atoms.

The repeating unit (1) is a repeating unit derived from a predetermined aromatic hydroxycarboxylic acid. As the repeating unit (1), a repeating unit in which $Ar^1$ represents a p-phenylene group (i.e., a repeating unit derived from p-hydroxybenzoic acid) or a repeating unit in which $Ar^1$ represents a 2,6-naphthylene group (i.e., a repeating unit derived from 6-hydroxy-2-naphthoic acid) is preferable.

The repeating unit (2) is a repeating unit derived from a predetermined aromatic dicarboxylic acid. As the repeating unit (2), a repeating unit in which $Ar^2$ represents a p-phenylene group (i.e., a repeating unit derived from terephthalic acid), a repeating unit in which $Ar^2$ represents a m-phenylene group (i.e., a repeating unit derived from isophthalic acid), a repeating unit in which $Ar^2$ represents a 2,6-naphthylene group (i.e., a repeating unit derived from 2,6-naphthalenedicarboxylic acid) or a repeating unit in which $Ar^2$ represents a diphenylether-4,4'-diyl group (i.e., a repeating unit derived from diphenylether-4,4'-dicarboxylic acid) is preferable.

The repeating unit (3) is a repeating unit derived from a predetermined aromatic diol, aromatic hydroxylamine or aromatic diamine. As the repeating unit (3), a repeating unit in which $Ar^3$ represents a p-phenylene group (i.e., a repeating unit derived from hydroquinone, p-aminophenol or p-phenylenediamine) or a repeating unit in which $Ar^3$ represents 4,4'-biphenylylene group (i.e., a repeating unit derived from 4,4'-dihydroxybiphenyl, 4-amino-4'-hydroxybiphenyl or 4,4'-diaminobiphenyl).

The amount of the repeating unit (1) based on the total amount of all repeating units (a value obtained by dividing the weight of each repeating unit constituting the liquid crystal polyester by the formula weight of the repeating unit to determine the amount of substance (mole), and summing the determined amounts) is preferably 30 mol % or more, more preferably 30 to 80 mol %, still more preferably 40 to 70 mol %, and still more preferably 45 to 65 mol %.

The amount of the repeating unit (2) based on the total amount of all repeating units is preferably no more than 35 mol %, more preferably 10 to 35 mol %, still more preferably 15 to 30 mol %, and still more preferably 17.5 to 27.5 mol %.

The amount of the repeating unit (3) based on the total amount of all repeating units is preferably no more than 35 mol %, more preferably 10 to 35 mol %, still more preferably 15 to 30 mol %, and still more preferably 17.5 to 27.5 mol %.

The larger the amount of the repeating unit (1), easier it becomes to improve the melt flowability, the heat resistance, the strength and the rigidity. However, when the amount of the repeating unit (1) is too large, the melt temperature and the melt viscosity tends to become high, so that the temperature required for molding is likely to become high.

The ratio of the amount of the repeating unit (2) to the amount of the repeating unit (3), i.e., [amount of repeating unit (2)]/[amount of repeating unit (3)] ratio (mol/mol) is preferably from 0.9/1 to 1/0.9, more preferably from 0.95/1 to 1/0.95, and still more preferably from 0.98/1 to 1/0.98.

The liquid crystal polyester may have two more types of the individual repeating units (1) to (3). Further, the liquid crystal polyester may have a repeating unit other than the repeating units (1) to (3), but the amount of such a repeating unit is preferably 10 mol % or less, more preferably 5 mol % or less.

As the repeating unit (3), it is preferable that the liquid crystal polyester has a repeating unit in which both X and Y represent an oxygen atom, i.e., a repeating unit derived from a predetermined aromatic diol because the melt viscosity tends to be decreased, and it is more preferable that the liquid crystal polyester has only a repeating unit in which both X and Y represent an oxygen atom as the repeating unit (3).

The liquid crystal polyester is preferably produced by melt polymerizing the raw monomers corresponding to the repeating units for constituting the liquid crystal polyester, and subjecting the obtained polymer (hereafter, frequently referred to as "prepolymer") to a solid-phase polymerization. In this manner, a high molecular weight liquid crystal polyester having high heat resistance, strength and rigidity can be produced with good operability. The melt polymerization may be performed in the presence of a catalyst. Examples of the catalyst include a metal compound such as magnesium acetate, tin (I) acetate, tetrabutyl titanate, lead acetate, sodium acetate, potassium acetate or antimony trioxide, and a nitrogen-containing heterocyclic compound such as 4-(dimethylamino)pyridine or 1-methylimidazole, and a nitrogen-containing heterocyclic compound is preferably used.

The flow starting temperature of the liquid crystal polyester is preferably 270° C. or higher, more preferably 270 to 400° C., and still more preferably 280 to 380° C. When the flow starting temperature is high, it becomes easier to improve the heat resistance, the strength and the rigidity. However, when the flow starting temperature is too high, the melt temperature and the melt viscosity tends to become high, so that the temperature required for molding is likely to become high.

The flow starting temperature is also called the flow temperature or the fluidizing temperature. The flow starting temperature is measured by using a capillary rheometer in which the liquid crystal polyester is melted under a load of 9.8 MPa (100 kg/cm$^2$) while elevating the temperature at a rate of 4° C./min, and the temperature at which the liquid crystal polyester exhibits a viscosity of 4,800 Pas (48,000 poise) when the liquid crystal polyester is extruded from a nozzle having an inner diameter of 1 mm and a length of 10 mm is defined as the flow starting temperature. The flow starting temperature can be used as a yardstick for the molecular weight of the liquid crystal polyester (see p. 95 of "liquid polymer—synthesis, molding, application—" edited by Naoyuki Koide, published by CMC Publishing CO., LTD., Jun. 5, 1987).

If desired, the liquid crystal polyester composition may further contain one or more other components such as a filler, an additive or a resin other than liquid crystal polyester.

The filler may be a fibrous filler, a plate-shaped filler or a spherical or particulate filler other than fibrous filler and plate-shaped filler. Further, the filler may be an inorganic filler or an organic filler.

Examples of the inorganic filler include a glass fiber; a carbon fiber such as a PAN-type carbon fiber or a pitch-type carbon fiber; a ceramic fiber such as a silica fiber, an alumina fiber or a silica-alumina fiber; and a metal fiber such as a stainless steel fiber. Other examples include a potassium titanate whisker, a barium titanate whisker, a wollastonite whisker, an aluminum borate whisker, a silicon nitride whisker and a silicon carbide whisker.

Examples of the fibrous organic filler include a polyester fiber and an aramid fiber.

The amount of the fibrous filler relative to 100 parts by weight of the liquid crystal polyester is 20 to 200 parts by weight.

Examples of the plate-shaped inorganic filler include talc, mica, graphite, wollastonite, glass flake, barium sulfate and calcium carbonate. Mica may be muscovite, phlogopite, fluorphlogopite or tetrasilic mica.

Examples of the particulate filler include silica, alumina, titanium oxide, glass beads, glass balloon, boron nitride, silicon carbide and calcium carbonate. The amount of the filler relative to 100 parts by weight of the liquid crystal polyester is preferably from 0 to 100 parts by weight.

Examples of the additive include an antioxidant, a heat stabilizer, an ultraviolet absorber, an antistatic agent, a surfactant, a flame retardant and a colorant. The amount of the additive relative to 100 parts by weight of the liquid crystal polyester is preferably from 0 to 5 parts by weight.

Examples of the resin other than liquid crystal polyester include thermoplastic resins other than liquid crystal polyester, such as polypropylene, polyester (excluding liquid crystal polyester), polysulfone, polyphenylenesulfide, polyetherketone, polycarbonate, polyphenyleneether and polyetherimide; and thermosetting resins, such as a phenol resin, an epoxy resin, a polyimide resin and a cyanate resin. The amount of the resin other than liquid crystal polyester relative to 100 parts by weight of the liquid crystal polyester is preferably from 0 to 20 parts by weight.

The amount of the filler other than fibrous fillers relative to 100 parts by weight of the liquid crystal polyester is preferably from 20 to 200 parts by weight.

(Extruder)

Next, the extruder 10 used in the method according to the present embodiment will be described in detail with reference to FIG. 1.

The extruder 10 according to the present embodiment is a twin-screw extruder having two screws 3 inserted in the cylinder 2. Examples of the twin-screw extruder include a co-rotating, single-flighted, double-flighted or triple-flighted screw extruder, and a counter-rotating, parallel-axis, bent-axis or non-intermeshing extruder, although a co-rotating twin-screw extruder is preferable.

On a most upstream position, the cylinder 2 is provided with a supply port 4 which supplies the resin into the cylinder 2. On the downstream side of the supply port 4, a first vent 51, a first addition port 61, a second vent 52, a second addition port 62 and a third vent 53 are provided in this order.

The supply port 4 has a hopper connected to the inside of the cylinder 2 and a supply device which supplies the resin at a constant mass or volume. Examples of the supplying method of the supply device include a belt type, a screw type, a vibration type and a table type.

The first vent 51 is provided downstream of the first kneading portion 81. Likewise, the second vent 52 is provided downstream of the second kneading portion 82, and the third vent 53 is provided downstream of the third kneading portion 83. That is, the first vent 51 is provided in correspondence with the first kneading portion 81, the second vent 52 is provided in correspondence with the second kneading portion 82, and the third vent 53 is provided in correspondence with the third kneading portion 83. By providing a vent 5 downstream of a kneading portion 8, the gas generated in each kneading portion is discharged from the corresponding vent 5, thereby enabling a stable production of a strand. Two or more vents 5 for one kneading portion 8 may be provided downstream thereof.

The length of the bent 5 (the length of the opening connecting the outside with the inside of the cylinder 2 in the lengthwise direction of the screw) is preferably 0.5 to 5 times the screw diameter (D) of the screw 3. When the length of the vent 5 is too small, the exhaustion effect becomes unsatisfactory. When the length of the vent 5 is too large, a foreign matter may get mixed, or vent-up (upwelling of molten resin through the vent) may occur.

The width of the opening of the vent 5 is preferably 0.3 to 1.5 times the screw diameter (D) of the screw 3. When the width of the opening of the vent 5 is too small, the exhaustion effect becomes unsatisfactory. When the width of the opening of the vent 5 is too large, a foreign matter may get mixed, or vent-up (upwelling of molten resin through the vent) may occur.

The vent 5 may be an open-type vent which is opened to air, or a vacuum-type vent which is connected to a water-seal pump, a rotary pump, an oil diffusion pump, a turbo pump or the like to maintain the vent in vacuum.

The screw 3 has a transport part 7 which transports the resin and a kneading portion 8 where the resin is kneaded. The kneading portion 8 is provided at three points from the upstream side (from the upstream side, the first kneading portion 81, the second kneading portion 82 and the third kneading portion 83).

Such screw 3 is configured by combining screw elements. In general, the transport part 7 is composed of a forward flight (full-flight) screw element, and the kneading portion 8 is composed of a screw element such as full-flight, reverse-flight, a seal ring, a forward kneading disc or a reverse kneading disc, and these screw elements are combined to configure the screw 3.

(First Kneading Portion)

In the present embodiment, the configuration of the screw at the first kneading portion 81 is not particularly limited, and various configurations can be employed as long as it promotes melting of the liquid crystal polyester to an extent that part of the liquid crystal polyester remain unmelted. For example, as the screw configuration of the first kneading portion 81, there can be mentioned a combination of a forward kneading disc (3R), a neutral kneading disc (3N) and a reverse kneading disc (3L) which are disposed in the order of 3R, 3N, 3N, 3N, 3L and 3L from the upstream side.

Here, the "3" that is included in the symbols "3R" "3N" and "3L" representing the respective kneading discs means that one screw element is configured with three kneading discs. Likewise, for example, when a forward kneading disc is denoted (5R), "5", means that one screw element is configured with five kneading discs.

(First Addition Port 1)

Like the supply port 4, the first addition port 61 has a hopper connected to the inside of the cylinder 2 and a supply device which supplies the resin at a constant mass or volume. Examples of the supplying method of the supply device include a belt type, a screw type, a vibration type and a table type.

Among the aforementioned other components such as a filler, an additive and a resin other than liquid crystal polyester, a filler other than fibrous fillers is added from the first addition port 61. For example, the aforementioned plate-shaped filler such as talc or mica is added.

The present inventors have found that, in the production of pellets by subjecting a liquid crystal polyester to melt extrusion, when the temperature (T1) of the liquid crystal polyester after kneading at the first kneading portion 81 provided at a nearest position upstream of the first addition port 61 for adding a filler other than fibrous fillers and the temperature (T2) of the liquid crystal polyester after kneading at the second kneading portion 82 provided at a nearest position downstream of the first addition port 61 satisfy the following formulae, hydrolysis of the liquid crystal polyester during processing can be suppressed.

$$FT-100(°C.) \leq T1 \leq FT+20(°C.) \quad (1)$$

wherein T1 represents the temperature of the liquid crystal polyester after kneading, and FT represents the flow starting temperature of the liquid crystal polyester.

$$FT-100(°C.) \leq T2 \leq FT+30(°C.) \quad (2)$$

wherein T2 represents the temperature of the liquid crystal polyester after kneading, and FT represents the flow starting temperature of the liquid crystal polyester.

(Second Kneading Portion)

In order to satisfy the above formulae, it is preferable that the second kneading portion 82 has a screw configuration in which no reverse kneading disc is used. A screw configuration in which no reverse kneading disc is used enables a weak kneading, so that the liquid crystal polyester becomes less susceptible to hydrolysis caused by a filler other than fibrous fillers.

Further, since the generation of volatile components (gas) by hydrolysis can be suppressed, various deficiencies caused by the gas can be suppressed, for example, a deficiency in which the liquid crystal polyester does not intermesh with the flight of the screw, and shoot up caused by the gas generated from the second kneading portion flowing into the first addition port 61.

Furthermore, since the extruder 10 used in the method of the present embodiment is provided with a second vent 52 downstream of the second kneading portion 82, even when a gas is generated from the second kneading portion 82, the gas can be satisfactorily discharged.

(Second Addition Port)

Like the supply port 4, the second addition port 62 has a hopper connected to the inside of the cylinder 2 and a supply device which supplies the resin at a constant mass or volume. Examples of the supplying method of the supply device include a belt type, a screw type, a vibration type and a table type.

From the second addition port 62, the aforementioned fibrous filler is added. When a fibrous filler is used as the filler, there is a possibility that the fibrous filler is broken during the kneading, thereby deteriorating various properties such as mechanical strength. Therefore, by supplying the fibrous filler from the second addition port 62, and conducting the kneading of the liquid crystal polyester and the fibrous filler mainly at the third kneading portion 83, the kneading time of the fibrous filler can be shortened, thereby suppressing the deterioration of various properties.

(Third Kneading Portion)

The configuration of the screw at the third kneading portion 83 is not particularly limited, and various configurations can be employed as long as it promotes melting of the liquid crystal polyester to completely melt the liquid crystal polyester. By employing such a configuration, the filler and the like supplied from the addition port 6 can be satisfactorily kneaded with the molten liquid crystal polyester.

Further, in the extruder 10 used in the method of the present embodiment, since a third vent 53 is provided downstream of the third kneading portion 83, even when a gas is generated from the third kneading portion 83, the gas can be satisfactorily discharged. As the third vent 53, it is preferable to use a vacuum-type vent, and the degree of vacuum in terms of the gauge pressure is preferably −0.05 MPa or less. By virtue of such a configuration, the gas can be satisfactorily removed, and the productivity can be improved.

On the downstream end of the cylinder 2, a strand die 9 having a nozzle 9a communicating with the cylinder 2 is provided.

In the method of producing a liquid crystal polyester composition according to the present embodiment, a twin-screw extruder as described above is used for pelletizing.

According to the method of producing a liquid crystal polyester composition as described above, since a strong kneading is not conducted at the second kneading portion 82 after adding talc from the first addition port 61, hydrolysis of the liquid crystal polyester caused by talc can be suppressed, thereby enabling production of a liquid crystal polyester composition in which deterioration of the heat resistance is suppressed.

While an example of a preferred embodiment of the present invention has been described above with reference to the attached figures, it should be noted that these are exemplary of the invention and are not to be considered as limiting the present invention. Additions, omissions, substitutions, and other modifications can be made without departing from the scope of the present invention.

EXAMPLES

As follows is a description of examples of the present invention, although the scope of the present invention is by no way limited by these examples.

[Measurement of Flow Starting Temperature]

The flow starting temperature of the liquid crystal polyester was measured using a flow tester (product name: CFT-500; manufactured by Shimadzu Corporation). About 2 g of a liquid crystal polyester was filled into a cylinder equipped with a die having a nozzle with an inner diameter of 1 mm and a length of 10 mm, and the liquid crystal polyester was melted under a load of 9.8 MPa (100 kg/cm$^2$) while elevating the temperature at a rate of 4° C./min. The temperature at which the liquid crystal polyester exhibited a viscosity of 4,800 Pa·s (48,000 poise) when the liquid crystal polyester was extruded from the nozzle was determined as the flow starting temperature.

[Measurement of Resistance to Soldering Heat]

Pellets produced in the examples and comparative examples described below were dried at 130° C. for 5 hours, followed by injection molding to form a mini dumbbell test specimen (JIS-K71131(1/2)). The test specimen was immersed in a heated solder bath for 1 minute, and the maximum temperature at which no deformation or blister (abnormal swelling) of the test specimen was observed was determined as the soldering heat resistance temperature. The temperature was elevated at intervals of 5° C. Based on the measured values, test specimen having a higher soldering heat resistance temperature was judged to exhibit a high heat resistance.

[Measurement of Resin Temperatures after Kneading at First Kneading Portion and Second Kneading Portion]

The resin temperature of the liquid crystal polyester after kneading was measured using a non-contact thermometer (product name: IT-550S; manufactured by HORIBA) by setting the emissivity at 0.86. The temperature of the resin transferred through the cylinder 2 was measured from the first vent 51 and the second vent 52, and the obtained values were used to determine the resin temperature.

Example 1

Figure 2:
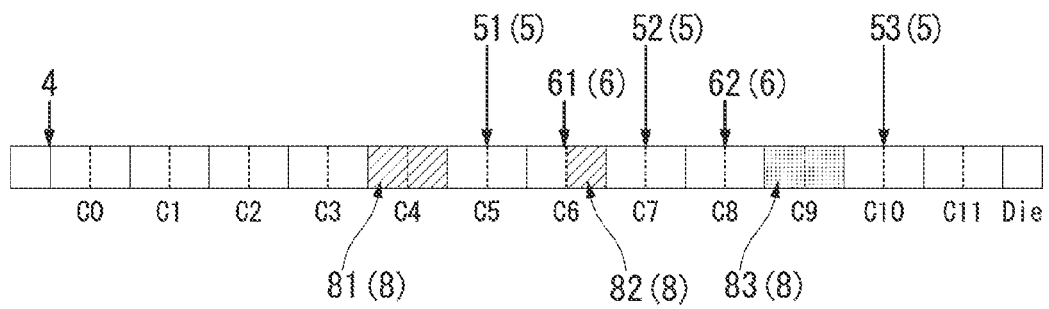
FIG. 2 is an explanatory diagram of the working examples.
Figure 3:
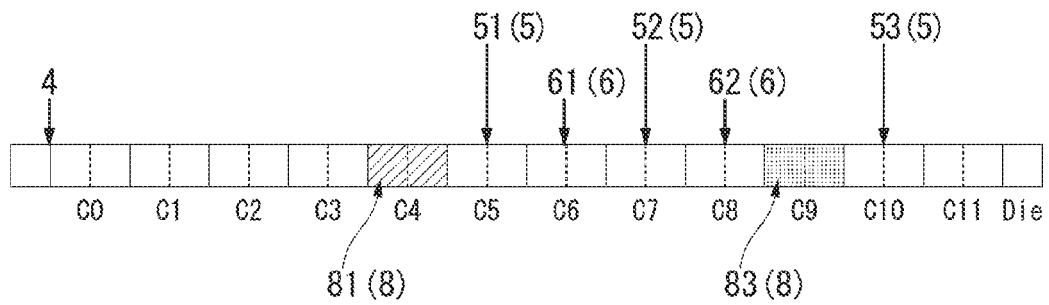
FIG. 3 is an explanatory diagram of the working examples.

FIG. 2 is a schematic diagram showing heaters provided in the cylinder 2 of the extruder used in Example 1. In FIG. 2, the positions of the respective components of the extruder corresponding to the heaters are shown using the same symbols as in FIG. 1.

The extruder used was a twin-screw extruder (product name: PCM30; manufactured by IKEGAI) having a cylinder provided with individually controllable heaters C0 to C11, two screws which co-rotate by a motor inserted in the cylinder (screw diameter D: 30 mm; L2/D=42.6), and provided with a supply port 4, a first vent 51, a first addition port 61, a second vent 52, a second addition port 62 and a third vent 53 in this order from the upstream side.

The screw used had a configuration in which the screw configuration at the first kneading portion 81 was a combination of 3R, 3N, 3N, 3N, 3L and 3L disposed in this order from the upstream side, the screw configuration at the second kneading portion 82 was a combination of 5R and 5N disposed in this order from the upstream side, and the screw configuration at the third kneading portion 83 was a combination of 3R, 5N, 5N, 5L, 3N and 3L in this order.

The first kneading portion 81 of the screw is disposed at a position overlapping the heater C4, the second kneading portion 82 is disposed at a position overlapping the heater C6, and the third kneading portion 83 is disposed at a position overlapping the heater C9. In the figure, the position of each kneading portion is indicated by shading.

Using the extruder, 65 parts by weight of a liquid crystal polyester (product name: SUMIKASUPER E 6000HF; manufactured by Sumitomo Chemical Company; flow starting temperature: 305° C.) was fed from the supply port 4, 13 parts by weight of talc (product name: X-50; manufactured by NipponTalc Co. Ltd.) was fed from the first addition port 61, 22 parts by weight of a glass fiber (product name: CS03JAPx-1; manufactured by Owens Corning) was fed from the second addition port 62 to perform melt kneading, thereby forming pellets at a discharge rate of 30 kg/hr.

The extrusion conditions were as follows. The cylinder temperature was adjusted to 280° C. at C0, 330° C. at C1 to C4, 340° C. at C5 to C11, 360° C. at the dice. The screw speed was 200 rpm.

Further, the degree of vacuum of the third vent 53 in terms of the gauge pressure was maintained at −0.09 MPa (the atmospheric pressure being 0 MPa). The first vent 51 and the second vent 52 were atmospheric pressure (open vent).

Example 2

Pellets containing liquid crystal polyester were produced in the same manner as in Example 1, except that the screw configuration at the position corresponding to the second kneading portion 82 was changed to full flight, and the second kneading portion 82 was eliminated.

Example 3

Pellets containing liquid crystal polyester were produced in the same manner as in Example 1, except that the temperature of heater C6 was changed to 250° C.

Comparative Example 1

Pellets containing liquid crystal polyester were produced in the same manner as in Example 1, except that the screw configuration at the second kneading portion 82 was changed to a combination of 5N and 5L disposed in this order from the upstream side.

Comparative Example 2

Pellets containing liquid crystal polyester were produced in the same manner as in Example 1, except that the screw configuration at the second kneading portion 82 was changed to a combination of 5R, 5N and 5L disposed in this order from the upstream side.

The resin temperature of the liquid crystal polyester after kneading at the first kneading portion 81, the resin temperature of the liquid crystal polyester after kneading at the second kneading portion 82 and the soldering heat resistance temperature in each of Examples 1 to 3 and Comparative Examples 1 and 2 are shown in Table 1 below.

TABLE 1

| | Resin temperature (° C.) (After kneading at first kneading portion) | Resin temperature (° C.) (After kneading at second kneading portion) | Soldering heat resistance temperature (° C.) |
|---|---|---|---|
| Example 1 | 317 | 330 | 280 |
| Example 2 | 317 | 310 | 270 |
| Example 3 | 318 | 325 | 290 |
| Comparative Example 1 | 318 | 351 | 250 |
| Comparative Example 2 | 318 | 356 | 240 |

From the results of the measurements, it was found that, by the method of the present invention, the heat resistance of the molded article can be improved. Thus, the usefulness of the present invention was confirmed.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A method of producing a liquid crystal polyester composition using a twin-screw extruder, the method comprising:
   supplying a liquid crystal polyester to a supply port of the twin-screw extruder;
   introducing a filler other than fibrous fillers to a first addition port of the twin-screw extruder and introducing a fibrous filler to a second addition port of the twin-screw extruder, the first and second addition ports being located downstream of the supply port;
   melt-kneading the liquid crystal polyester, the filler other than fibrous fillers and the fibrous filler together using a screw of the twin-screw extruder to produce a liquid crystal polyester composition, the screw being provided with kneading portions on the upstream side and downstream side of the first addition port, the kneading portion provided nearest to the first addition port on the downstream side thereof having a screw configuration which does not use a reverse kneading disc; and
   extruding the melt-kneaded liquid crystal polyester composition from the twin-screw extruder,
   wherein a resin temperature of the liquid crystal polyester after being kneaded in the kneading portion provided nearest to the first addition port on the upstream side thereof satisfying formula (1) shown below:

$$FT-100(°C.) \leq T1 \leq FT+20(°C.) \quad (1)$$

wherein a resin temperature of the liquid crystal polyester after being kneaded in the kneading portion provided nearest to the first addition port on the downstream side thereof satisfying formula (2) shown below:

$$FT-100(°C.) \leq T2 \leq FT+30(°C.) \quad (2),\text{ and}$$

wherein T1 represents a temperature of the liquid crystal polyester after kneading, T2 represents a temperature of the liquid crystal polyester after kneading, and FT represents the flow starting temperature of the liquid crystal polyester.

2. The method according to claim 1, wherein the first addition port is provided upstream of the second addition port.

3. The method according to claim 1, wherein the cylinder has a vent provided downstream of the kneading portion provided nearest to the first addition port on the downstream side thereof.

4. The method according to claim 1, wherein the cylinder has a vent, the vent provided most downstream is a vacuum vent, and a gauge pressure of the vacuum vent is −0.05 MPa or less.

5. The method according to claim 1, wherein the filler other than fibrous fillers is talc or mica.

6. The method according to claim 1, wherein the liquid crystal polyester composition comprises 100 parts by weight of the liquid crystal polyester, 20 to 200 parts by weight of the filler other than fibrous fillers, and 20 to 200 parts by weight of the fibrous filler.

* * * * *